United States Patent [19]
Olle

[11] Patent Number: 5,242,653
[45] Date of Patent: Sep. 7, 1993

[54] INJECTION-EXTRUSION BLOW MOLDING PROCESS FOR FORMING A BIORIENTED HOLLOW BODY

[76] Inventor: Salvador P. Olle, 30, rus Ibnou Adara El Marrakouchi, Casablanca, Morocco

[21] Appl. No.: 789,921

[22] Filed: Nov. 12, 1991

[30] Foreign Application Priority Data

Nov. 12, 1990 [ES] Spain ............................ 9002858
Nov. 12, 1990 [ES] Spain ............................ 9002860

[51] Int. Cl.⁵ .................... B29C 49/02; B29C 49/04; B29C 49/08; B29C 49/64
[52] U.S. Cl. ............................. 264/531; 264/539; 425/526
[58] Field of Search .............. 264/539, 531, 537, 540, 264/523, 532; 425/526, 532, 533

[56] References Cited

U.S. PATENT DOCUMENTS

| | | | |
|---|---|---|---|
| 2,175,053 | 10/1939 | Ferngren | 264/539 |
| 2,288,454 | 6/1942 | Hobson | 264/539 |
| 3,733,309 | 5/1973 | Wyeth et al. | 264/539 |
| 4,264,558 | 4/1981 | Jacobsen | 264/523 |

FOREIGN PATENT DOCUMENTS

| | | | |
|---|---|---|---|
| 2528964 | 1/1977 | Fed. Rep. of Germany | 264/539 |
| 4312031 | 5/1943 | Japan | 264/539 |
| 443985 | 2/1944 | Japan | 264/539 |

*Primary Examiner*—Catherine Timm
*Attorney, Agent, or Firm*—Bell, Seltzer, Park & Gibson

[57] ABSTRACT

A process and apparatus for the injection-extrusion blow molding of a hollow tubular plastic product useful as a liquid container or the like, and which includes the steps of injecting a predetermined amount of the thermoplastic resin into a tubular cavity so as to form a tubular first preform having a closed end, and then axially extruding the tubular first preform so as to extend the bottom end and form a hollow second perform. The second preform is then blow molded outwardly against the internal surface of a blow mold to form a bioriented finish product. The first preform may be heat conditioned prior to the step of axially extruding the same, and the blow mold may be provided with an axially moveable bottom wall which permits a finished product to be formed having a substantially uniform wall thickness.

8 Claims, 5 Drawing Sheets

INJECTION-EXTRUSION BLOW MOLDING PROCESS FOR FORMING A BIORIENTED HOLLOW BODY

BACKGROUND OF THE INVENTION

1. Field of the Invention

The present invention relates to a process and apparatus for blow molding thermoplastic resins, particularly for obtaining hollow bodies such as bottles and the like.

2. Prior Art

Extrusion blow molding techniques for hollow bodies habitually suffer from serious limitations and drawbacks. Thus, in the case of injection and blow molding, irregularities occur in the weight and gauges, in welds, in material to be recycled and in the gauging of the bottle neck, the result being products of poor strength and finish.

In the case of biorientated injection and blow molding with cores and preforms, contemplated in Spanish patent No. 505.091, it is not feasible to obtain containers with handles, narrow necks or flattened bodies, nor is it possible to vary the weight, once set. In preforms of great thickness, it is difficult to homogenize the temperature thereof to heat condition the material, whereby in certain cases a prior cooling or heating is necessary. This is costly in energy, requires more time and installations of certain complexity.

SUMMARY OF THE INVENTION

The process of the invention avoids the above drawbacks and is characterized in that, in a first step, there is injected into one or more molds having narrow cavities of large surface area, forming heat conditioning tubular cavities, a metered amount of resin which acquires an appropriate thermal balance to pass from the thermoplastic to the thermoelastic state to enable molecular biorientation, there taking place a second step by which, through mechanical extrusion operations, there is obtained a hollow preform of controlled thicknesses and having a closed bottom, after which there is performed a third step in which, by means of one or more blow molds associated with the previous ones, the material is inserted therein for the final blow molding operation.

According to the invention, in the blow molds the resin forms an elongate hollow body which thereafter spreads out and becomes adapted to the inner shape of the mold, said body taking on the final molecularly bioriented shape.

According to a further embodiment of the invention, the blow molds are provided with an axially moveable bottom providing a base for the material initially entering the mold in generally spherical form, which bottom is retracted and lengthens the hollow body which, finally, is adapted to the inner shape of the mold by blowing with a regular distribution of the wall thickness.

The apparatus of the invention is characterized in that it is formed by one or more injection premolding molds, by one or more final blow molding molds, by means for injecting resin the first molds and a mechanism for coordinating the mutual positions of the premolding and final molding molds, said premolding molds being provided with a heat conditioning arrangement for the injected resin, comprising a large area, narrow tubular chamber, in which said resin passes from the thermoplastic to the thermoelastic state according to a tubular preform which at one end has an internal appendix, and a mechanical device biorientating the hollow preform, displaces the resin of the said appendix, forming a closed external tube and extrudes the same material towards the blow molds, said mechanical device being actuated by a cylinder set which coordinatedly moves the component members.

According to the invention, the mechanical device of the premolding molds comprises a central biorientation rod and, concentrically around the rod, a calibrating punch, a scavenging bushing, a closing sleeve and a thrust bushing, all of which are subjected to synchronized axial movement for displacement of the preform material towards the blow molds.

According to a preferred embodiment of the invention, the apparatus comprises a group of four premolding molds arranged orthogonally crosswise and a further group formed by two blow molds and two injectors, also crosswise in which the premolding molds are caused to rotate intermittently together for alternate axial opposition with the injectors and the blow molds, there being two actuating cylinders related with respective premolding molds for actuating the mechanical device and for the final blowing.

BRIEF DESCRIPTION OF THE DRAWING

Hereinafter there are explained and described drawings expressing the development of the process of the invention and of the corresponding apparatus.

DETAILED DESCRIPTION

A basic condition of the invention is the preparation of hollow bodies by way of a peculiar heat conditioning in a mold into which the resin is injected, so that the resin passes rapidly from the thermoplastic state to the thermoelastic state, which is feasible because the resin enters a large area, narrow tubular cavity.

Figure 1:
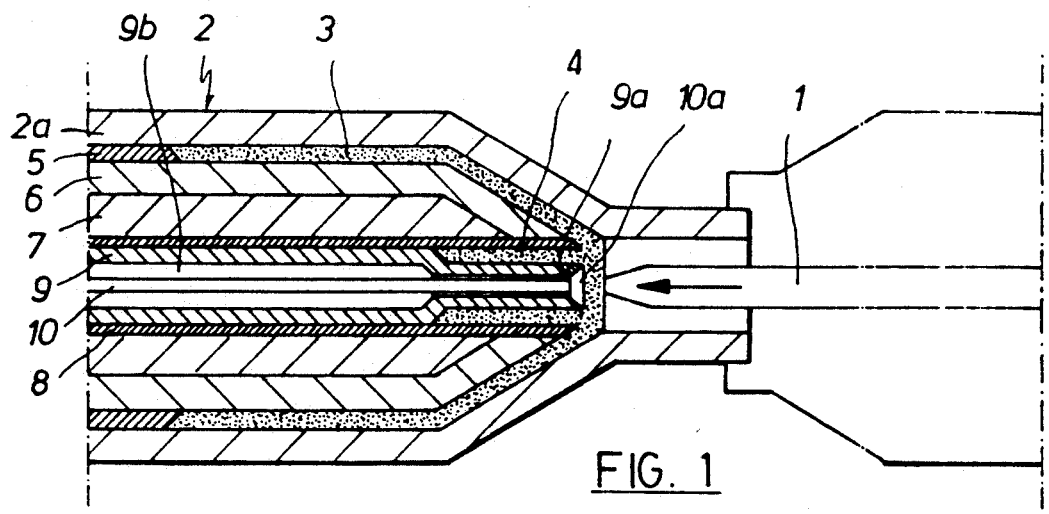
FIG. 1 is a schematic view of the injection step of the resin in a mold for obtaining a heat conditioned hollow body.

Thus, in FIG. 1, the initial step is shown, in which the resin is injected by an injector 1 in the tubular cavity 2 of the mold 2, which provides a tubular body 3 having a thin, large area wall, plus an internal appendix 4 attached to the front end thereof. In this situation, the body in question is subjected to the action of internal mechanical mutually concentric mold members consisting of an extrusion bushing 5 applied in the mold cavity, a jacket 6 forming the inner wall of this mold, a sleeve 7, a scavenging bushing 8, a calibrating punch 9 and a central biorientation rod 10, which move according to coordinated movements.

Figure 2:
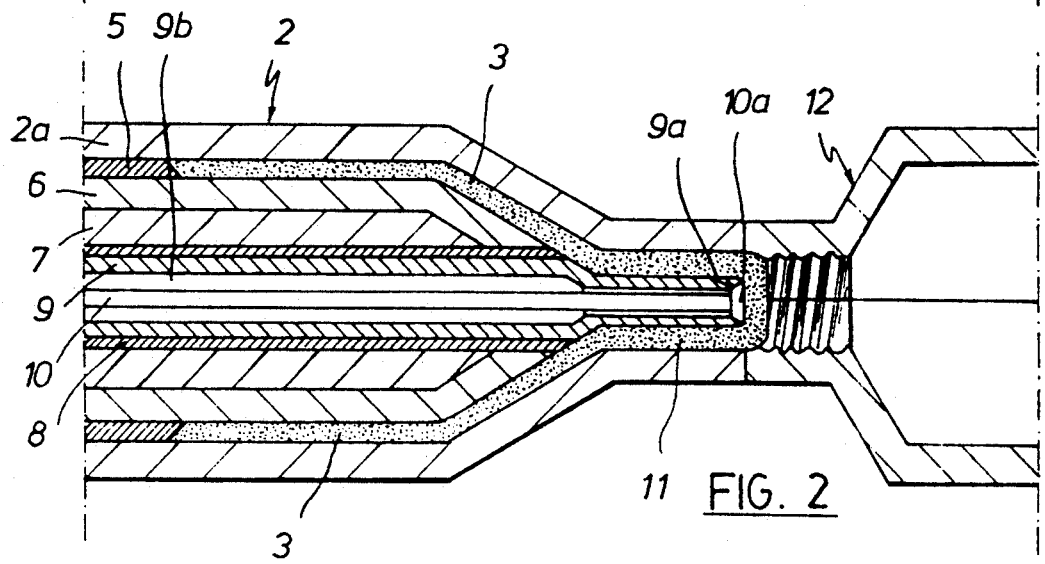
FIG. 2 shows the hollow body of FIG. 1, a closed tube being formed in the mold by mechanical extrusion means.

Thereafter, the punch 9 and the rod 10, driven by a pneumatic means, move to push the resin of the appendix 4 to form a closed tube 11, as seen in FIG. 2, with preblow. From this situation, the next step is the final molding, for which a blow mold 12 is used.

In this situation, the members of the mechanical device completely evacuate the resin from the mold 2 to the mold 12. Thus, in FIG. 3, the blowing is seen to be performed from the mold 2, provided with the pertinent air device, for which purpose such mold is placed opposite the mouth of the blow mold 12. In view of the thermoelastic conditions of the resin, the molding operation provides an elongate hollow body 13 which, in the final step, spreads out until it becomes adapted to the inner shape of the mold 12, which is to be seen in FIG. 5 where the final hollow body 14 is shown. At the end of the blowing operation, the members of the mechanical device of mold 2 retract to start a new molding operation.

Figure 4:
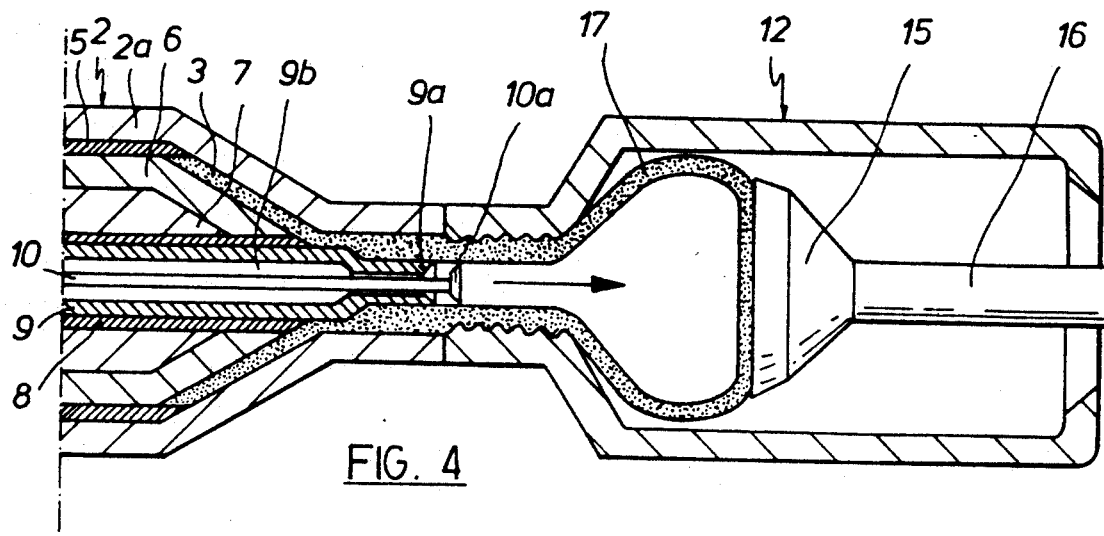
FIG. 4 shows a blow mold provided with a moving bottom, in which the final shaping of the hollow body is initiated.

This process includes the optional use of a moving bottom 15 for the blow mold 12, as shown in FIG. 4, axially driven from the outside by a shaft 16. In this case, from the position of FIG. 2, the resin 3 is foreced to the blow mold 12, forming therein a generally spherical body 17, see FIG. 4, which engages the flat front of the moving bottom 15.

Figure 5:
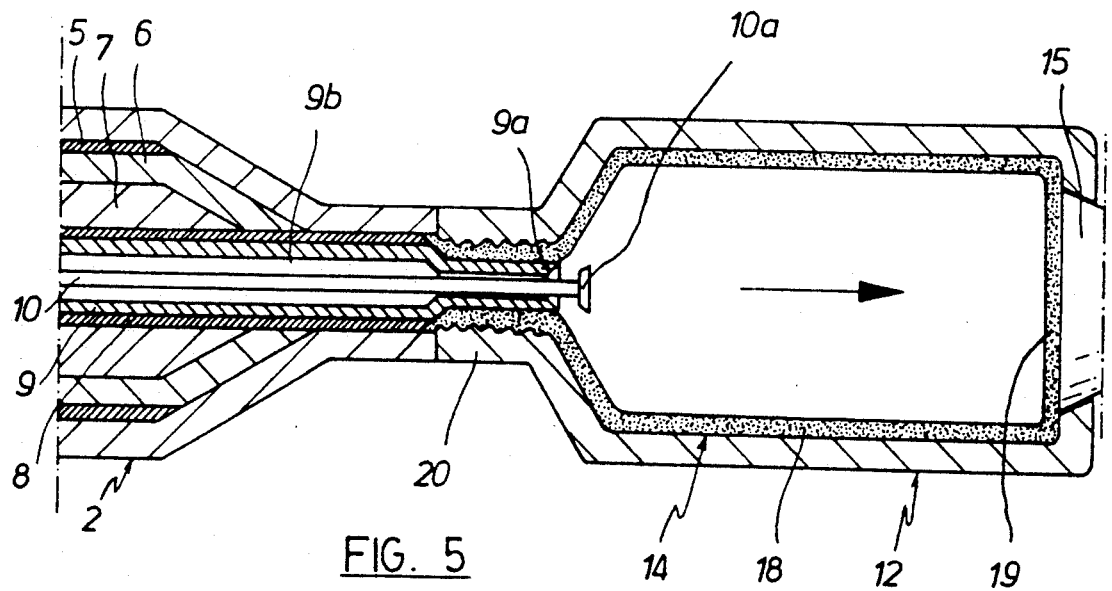
FIG. 5 shows the final shaping of the hollow body in the blow mold, applicable to the cases of FIGS. 3 and 4.

The moving bottom 15 is provided, through the shaft 16, with cooling oil and air circuits which form a vacuum which, when the bottom retracts, draws the hollow body along to the end wall of the mold, from which time the body, due to the blow action it continues to receive, spreads out to adapt itself to the inner shape of the mold, as shown in FIG. 5.

The resulting hollow body 14 has a tubular shape 18, a flat bottom 19 and a neck 20, the outstanding peculiarity being the achievement of uniform thickness in all the parts thereof, as was the objective according to the objects stated at the beginning of the description.

After molding the body 14, the blow mold 12 is opened and the body is stripped with the aid of the blowing effect.

Figure 6:
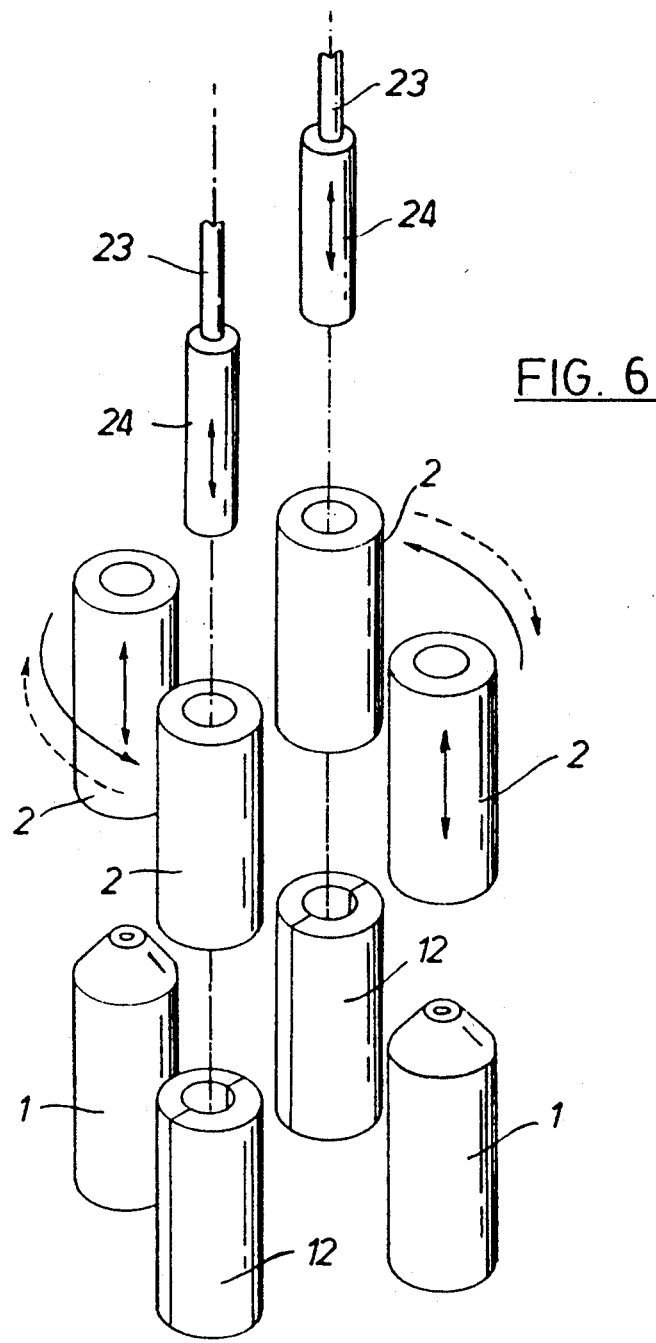
FIG. 6 is a schematic view, in perspective, showing the ensemble of bodies forming the apparatus in their relative positions.
Figure 7:
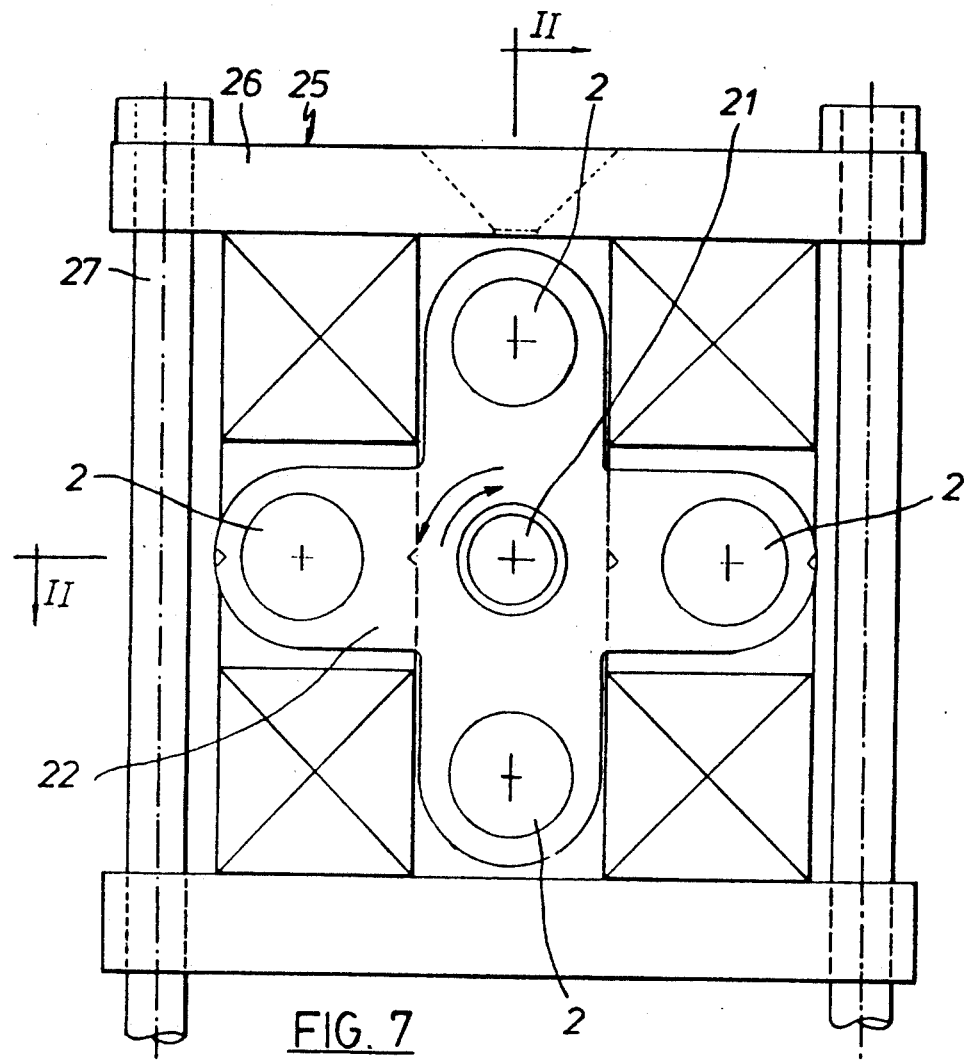
FIG. 7 is a plan view showing in simplified form a apparatus with four premolding molds, in an orthogonal arrangement.
Figure 8:
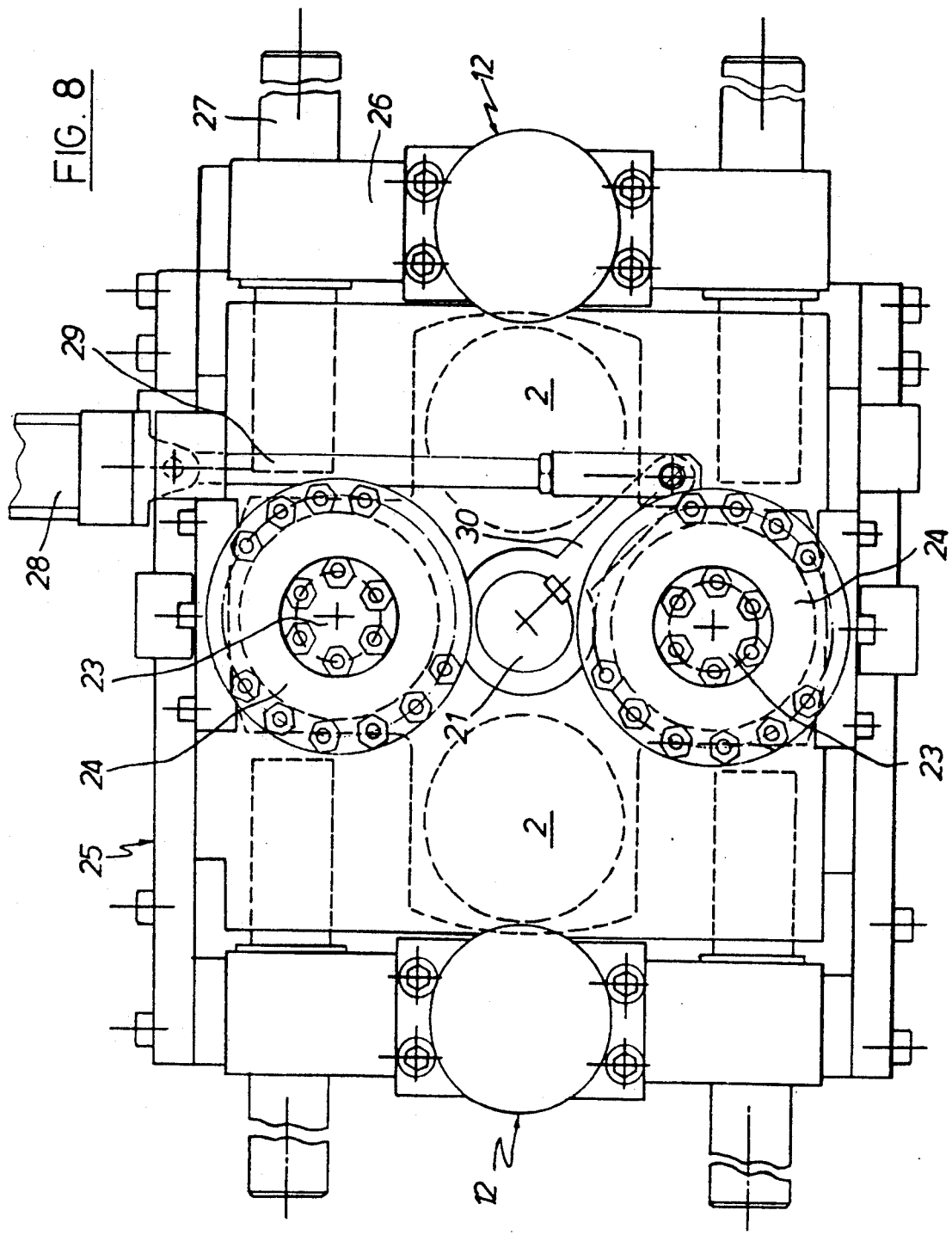
FIG. 8 is a view similar to FIG. 3, showing the frame for the premolding molds, the final molding molds and the actuating cylinders.

These molding operations may be carried out simultaneously for a plurality of hollow bodies by respective molds receiving the resin, assembled with a like number of blow molds, as observed in FIGS. 6, 7 and 8.

FIG. 6 gives an overall view of the component parts of the apparatus, according to an embodiment using four premolding molds 2, two final molds 12 and two injection heads 1.

In the present embodiment, according to FIG. 7, the apparatus comprises a rotary shaft 21 carrying a core 22 on which injection and extrusion premolding molds 2 are mounted. The said molds 2, mounted orthogonally crosswise, axially mate with two final blow molding molds 12 and two injectors 1 for the two by two alternating operations of the molds 2 relative to the remaining said members.

The molds 2 comprise a casing housing a drive mechanism composed of a biorientation rod 10 and, concentrically therewith, a calibrating punch 9, a scavenging bushing 8, a closing sleeve 7 and an extrusion bushing 5, all of which is seen in FIGS. 1 to 5. Between the rod 10 and the punch 9 there is formed an annular conduit 9b for the compressed blowing air, which is closed by the head 10a and the seat 9a, as seen in FIGS. 1 and 2. The extrusion bushing 5 moves between the jacket 6 and the casing 2a of the mold 2.

There are fluid circuits in the mold 2, namely: a thermal oil circuit, a cooling liquid circuit and air circuits, not shown, for heat conditioning the material.

There are two cylinders 23 and 24 for driving the mold 2 drive mechanism.

The cylinder 23 is coupled by its shaft to the biorientation rod 10 and to the calibrating punch 9.

The cylinder 24 drives the extrusion bushing 5.

The final molding molds 12 comprise two half molds which are associated with the premolding mold 2 head. The molds 12 are provided with a moving bottom 15, attached to a shaft 16 for guided axial movement. The shaft 16 is provided with air and cooling liquid conduits.

The sets of molds described are contained in a frame 25, to be seen in FIG. 7, designed in terms of the number of molds forming the apparatus and, in this case, houses four upper premolding molds 2, mating orthogonally with two lower final molding molds 12, concealed in the figure. The frame 25 comprises fixed cross members 26 and adjustable stringers 27.

To drive the apparatus, there are means for rotating the upper molds 2 in both directions alternately, in 90°, means for moving the lower molds 12 for coupling with the corresponding upper molds 2, means for opening and closing the two molds 12, means for operating the moving bottom 15 of the molds 12, means for injecting resin in the corresponding upper molds 2, and the said cylinders 23 for the extrusion, premolding and final blow molding operations.

In FIG. 8 there is to be seen a cylinder 28 for alternate rotation of the upper molds 2 by way of a connecting rod 29 and a crank 30.

The operation of the apparatus for an operative molding cycle is described below. Initially, the thermoplastic resin is injected by the injector 1 in the corresponding upper premolding mold 2, where it is immediately subjected to the above mentioned heat conditioning allowing the passage from the thermoplastic to the thermoelastic state, whereby a hollow body is obtained as preform, as seen in FIG. 1, wherein said preform has a cylindrical shape 3 with a closed end from which there extends internally a cylindrical appendix 4.

Figure 3:
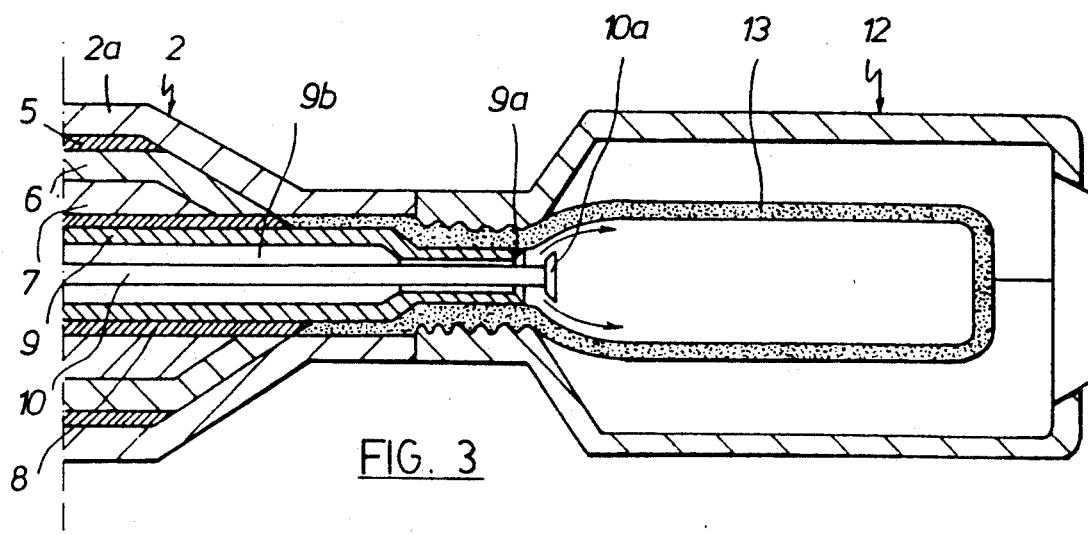
FIG. 3 shows the step of inserting the resin in a blow mold.

Thereafter the extrusion step starts, in which the cylinders 23 and 24 take part conjugating the movements of the elements coupled thereto. FIG. 2 shows the forward feed of the biorientation rod 10 and of the calibration punch 9, causing the resin of the appendix 4 to move, forming a closed tube 11 thicker than the rest. In FIG. 3 the preblowing operation starts, accompanying the penetration of the resin in the mold 12 forming a balloon 13, by way of the forward feed of the rod 10 and punch 9, with the separation of the head 10a from the seat 9a to make way for the preblow compressed air contained in the annular conduit 9b, as well as the forward feed of the closing sleeve 7 which contacts the bottom of the mold 2. FIG. 4 shows the forward feed of the scavenging bushing 8 which evacuates the resin remains from the mold 2, at the same time as there is initiated in the mold 12 the formation of a generally spherical hollow body 17 which adheres to the flat surface of the moving bottom.15 in the advanced position thereof by its polar region. Finally, according to FIG. 5, the formation of the container 14 to be manufactured is terminated, comprising the cylindrical contour 18, the neck 20 and the bottom 19. In this step, the moving bottom 15 has gradually retreated to the base of the mold, thereby creating a suction which attracts the hollow body. In this stage the mold 2 returns to the starting position of the members thereof. Thereafter the mold 12 is opened for stripping the resulting container by blowing.

The outstanding advantages achieved by the process are to be found in a saving of time and energy in the carrying out of the different steps, as a result of the resin heat conditioning process, with the passage from the thermoplastic to the thermoelastic state, allowing the biorientated hollow bodies to pass directly from one step to another. A further essential advantage is the fact that the resulting molded bodies are uniformly thick and, most particularly, the upper and lower edges of the bottle which require greater strength, contrarily to what happens in ordinary type blown bottles.

What I claim is:

1. A method of molding a thermoplastic resin comprising the steps of injecting a predetermined amount of the thermoplastic resin into a tubular cavity so as to form a tubular first preform (3) having a closed end and an open end, including injecting the resin along a first axial direction extending from said closed end toward said open end, heat conditioning the first preform to bring the first preform from the thermoplastic state to a thermoelastic state to enable molecular biorientation, extruding the heat conditioned tubular first perform including pushing the closed end in a second axial direction which is opposite to said first axial direction so as to form a hollow second preform (11), and blow molding the second preform outwardly against the internal surface of a blow mold to form a molecularly bioriented finished product (14), including delivering pressurized gas into the interior of said second preform.

2. The method as defined in claim 1 wherein the injecting step includes forming a tubular appendix (4) which extends from said closed end in said first axial direction and coaxially with respect to said tubular first preform, and wherein the extruding step includes pushing said appendix and said closed end in said second axial direction to form said second preform.

3. The method as defined in claim 1 wherein said blow mold is provided with an axially movable bottom wall, and wherein the blow molding step includes axially moving the bottom wall at a controlled speed so as to increase the internal size of the blow mold and produce a finished product having a controlled wall thickness.

4. The method as defined in claim 1 comprising the further subsequent step of opening the blow mold to permit removal of the finished product.

5. A method of molding a thermoplastic resin comprising the steps of injecting a predetermined amount of the thermoplastic resin into a tubular cavity so as to form a tubular first preform (3) having a closed end and an open end, including injecting the resin along a first axial direction extending from said closed end toward said open end, and further including forming a tubular appendix (4) which extends from said closed end in said first axial direction and coaxially with respect to said tubular first perform, extruding the tubular first perform, including pushing said appendix and said closed end in a second axial direction which is opposite to said first axial direction so as to form a hollow second preform (11), and blow molding the second preform outwardly against the internal surface of a blow mold to form a bioriented finished product (14), including delivering pressurized gas into the interior of said second preform.

6. The method as defined in claim 5 comprising the further step of heat conditioning the first preform prior to the step of extruding the same.

7. The method as defined in claim 5 wherein said blow mold is provided with an axially movable bottom wall, and wherein the blow molding step includes axially moving the bottom wall at a controlled speed so as to increase the internal size of the blow mold and produce a finished product having a controlled wall thickness.

8. The method as defined in claim 5 comprising the further subsequent step of opening the blow mold to permit removal of the finished product.

* * * * *